UNITED STATES PATENT OFFICE.

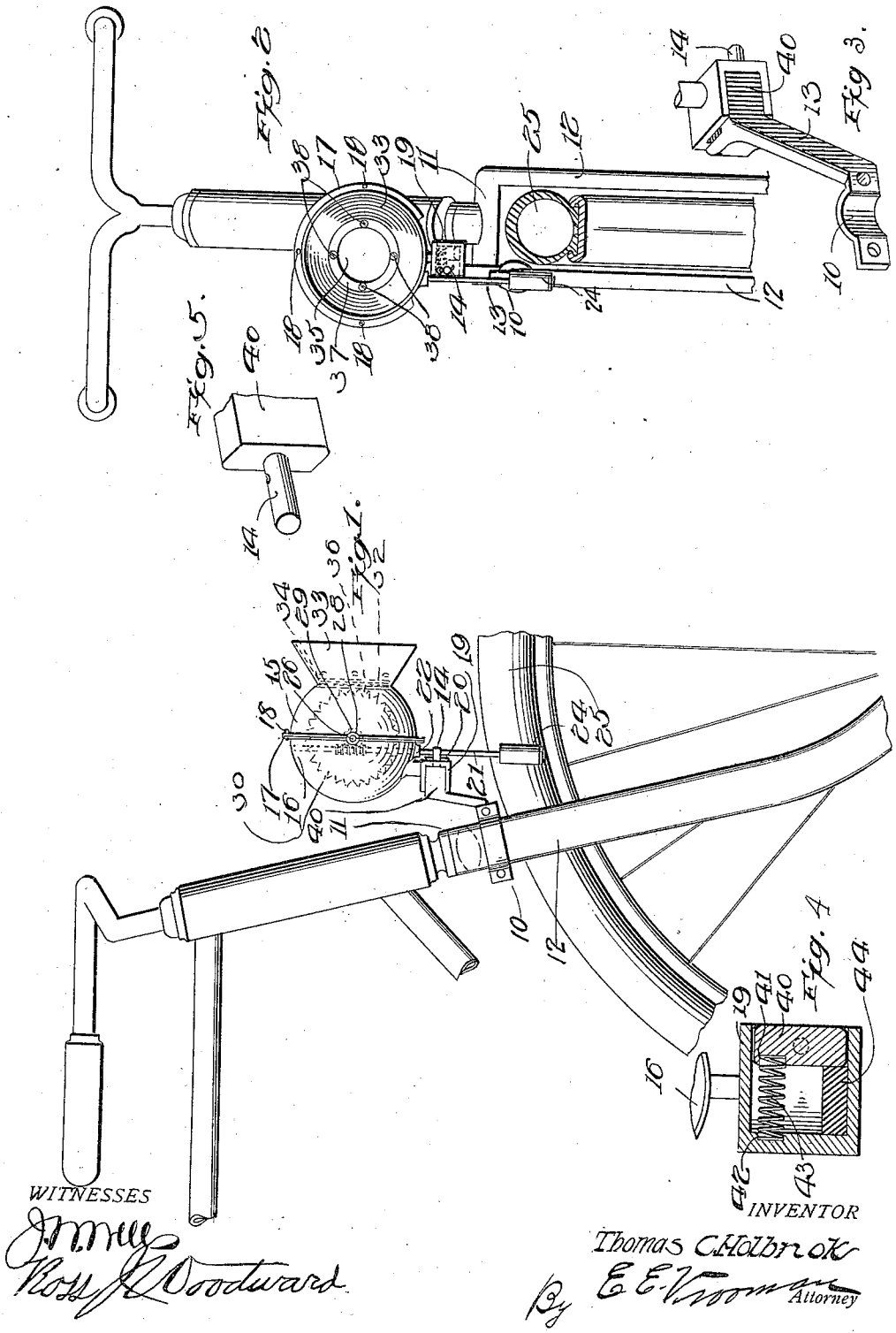

THOMAS C. HOLBROOK, OF BROWNSVILLE, TENNESSEE.

BICYCLE-ALARM.

1,041,474.

Specification of Letters Patent. Patented Oct. 15, 1912.

Application filed January 18, 1912. Serial No. 671,858.

*To all whom it may concern:*

Be it known that I, THOMAS C. HOLBROOK, a citizen of the United States, residing at Brownsville, in the county of Haywood and State of Tennessee, have invented certain new and useful Improvements in Bicycle-Alarms, of which the following is a specification, reference being had therein to the accompanying drawing.

This invention relates to alarms which are intended to be used upon bicycles and the like.

The invention comprises a casing in which there is mounted a diaphragm and operating mechanism to cause the diaphragm to vibrate. The operating mechanism extending through the casing is provided with a roller which comes in contact with the tire of the wheel so that when the wheel turns the alarm will be caused to operate. The casing is pivotally mounted upon a bracket so that the roller may be brought into and out of contact with the tire. The principal object of the same is to provide an improved type of bracket which will pivotally mount the casing and normally hold the roller out of engagement with the tire.

This invention is illustrated in the accompanying drawings, wherein: Figure 1 is a side elevation showing the alarm mounted upon a wheel. Fig. 2 is a front elevation showing the alarm in place. Fig. 3 is a perspective view of the bracket. Fig. 4 is a sectional view through the bracket. Fig. 5 is a perspective view of the end portion of the bracket.

Referring to the accompanying drawings by numerals it will be seen that this invention comprises the bracket 10 which is preferably mounted near the bridge 11 of the forks 12. The bracket carries an arm 13, the outer end portion 14 of which is round so that it forms a pivotal bearing for the alarm.

The alarm comprises the casing which is formed from forward and rear sections 15 and 16, the sections being provided with the flanges 17 which are connected together by means of the screws or rivets 18. The rear section carries a sleeve 19 which fits upon the bracket, and is held in place by means of the pin 20. It will thus be seen that the alarm will be rotatably mounted upon the outer end portion 14 of the bracket. A shaft 21 passes through the bearing 22, and is rotatably mounted in the rear portion of the casing. A roller 24 is rigidly mounted upon the outer end portion of the shaft 21 and is positioned so that when the alarm is rocked upon its bearing the roller will be brought into contact with the tire 25, and the shaft caused to rotate rapidly.

An axle 26 has its ends mounted in the bearings 28 formed in opposite sides of the flange formed upon the rear section, and is held in place by the flange of the front section which is also provided with bearings 29 in which the ends of the axle fit. The shaft 21 is provided with a worm screw 30 which rotates the axle 26 when the shaft 24 is rotated by the tire. A toothed wheel 32 is mounted upon the axle 26 to one side of the gear wheel 31, and operates the diaphragm so that when the alarm is in operation the diaphragm will be caused to vibrate.

The forward section 15 is provided with a mouthpiece 33 and with an inwardly extending flange 34. The diaphragm 35, which is formed from resilient material, fits upon the flange 34 and carries a tooth 36 which is engaged by the toothed wheel 32. The tooth 36, and the teeth of the wheel 32 are pitched at such an angle that the teeth of the wheel 32 will engage the tooth 36 to vibrate the diaphargm as the wheel 32 is rotated, without the teeth locking so that the wheel would be prevented from rotating. A securing ring 37 fits upon the diaphragm 35 and screws 38 pass through the ring, diaphragm and flange so that diaphragm will be held securely in place. Packing rings 39 are placed to each side of the diaphragm between the diaphragm and the flange and ring 37 so that the diaphragm will be securely held and prevented from slipping.

The end portion 40 of the arm 13 is provided with a socket 41 which is positioned in alinement with the socket 42 formed in the sleeve 19 when the sleeve is mounted upon the bracket. A spring 43 has its ends mounted in the sockets 41 and 42 so that the shaft 21 will normally be held vertical with the roller 24 out of engagement with the tire 25. An elastic abutment cushion 44 is mounted in the lower portion of the sleeve 19 so that when the alarm is returned to its normal position by the spring 43, the cushion will act as an abutment to limit the movement of the alarm in one direction. The alarm is rocked by any suitable device such as a cord.

When the alarm is rocked so that the roller 24 comes in contact with the tire, the shaft 21 is rotated and by the worm screw 30 rotates the axle 26 and tooth wheel 32. As the tooth wheel 32 rotates its teeth engage the tooth 36 and causes the diaphragm to be vibrated thus giving forth a loud noise.

What is claimed is:—

1. In a device of the character described, a container, a sleeve carried by said container and provided with a reduced opening in one end and with a socket in its side wall, a bracket having its end portion positioned in said sleeve and provided with a reduced end passing through the opening in the end of said sleeve whereby said container will be pivotally mounted upon said bracket, said bracket being provided with a socket formed in alinement with the socket of said sleeve, and a spring having its ends mounted in the sockets of said sleeve and bracket.

2. In a device of the character described comprising a container, a sleeve carried by said container, a bracket having one end rotatably mounted in said sleeve, a spring connecting said sleeve and bracket above the pivot point of said bracket, and an abutment mounted in said sleeve and forming a stop to limit the pivotal movement in one direction.

In testimony whereof I hereunto affix my signature in presence of two witnesses.

THOMAS C. HOLBROOK.

Witnesses:
W. W. KLYCE,
H. M. DIXON.

Copies of this patent may be obtained for five cents each, by addressing the "Commissioner of Patents, Washington, D. C."